United States Patent [19]

Hirabayashi et al.

[11] Patent Number: 5,726,875
[45] Date of Patent: Mar. 10, 1998

[54] AC-DC ADAPTER

[75] Inventors: Masayuki Hirabayashi; Hirotaka Yamamoto, both of Fukuoka, Japan

[73] Assignee: Mitsumi Electric Co. Ltd., Chofu, Japan

[21] Appl. No.: 760,516

[22] Filed: Dec. 6, 1996

Related U.S. Application Data

[63] Continuation of Ser. No. 312,769, Sep. 27, 1994, abandoned.

[30] Foreign Application Priority Data

Sep. 27, 1993 [JP] Japan ................. 5-056754 U
Sep. 27, 1993 [JP] Japan ................. 5-056755 U

[51] Int. Cl.$^6$ ........................................ H02M 1/10
[52] U.S. Cl. ................ 363/142; 363/143; 323/278; 323/274
[58] Field of Search ........................ 323/263, 274, 323/276, 278; 363/89, 142, 143

[56] References Cited

U.S. PATENT DOCUMENTS

| | | | |
|---|---|---|---|
| 4,585,988 | 4/1986 | Nakai | 323/285 |
| 4,823,023 | 4/1989 | Shimpo et al. | 307/254 |
| 5,041,777 | 8/1991 | Riedger | 323/277 |
| 5,126,652 | 6/1992 | Carlin | 323/267 |

Primary Examiner—Peter S. Wong
Assistant Examiner—Shawn Riley
Attorney, Agent, or Firm—Whitham, Curtis, Whitham & McGinn

[57] ABSTRACT

An AC-DC adapter includes a power transformer to which an AC voltage is applied, a rectifier circuit for rectifying and smoothing an AC voltage developed across the secondary side of said power transformer, and DC voltage stabilizing member for stabilizing a DC voltage outputted by said the rectifier circuit.

20 Claims, 2 Drawing Sheets

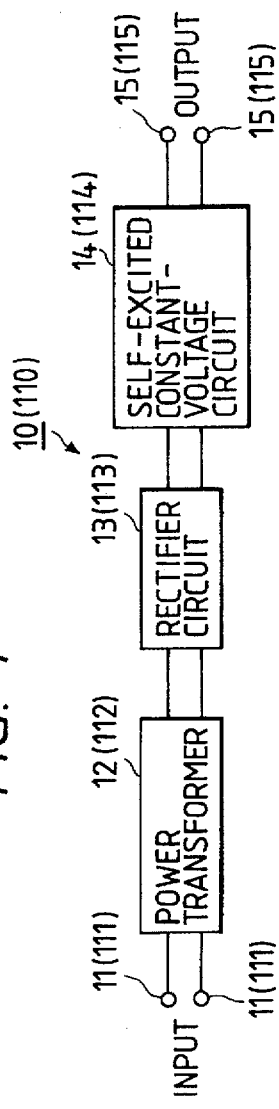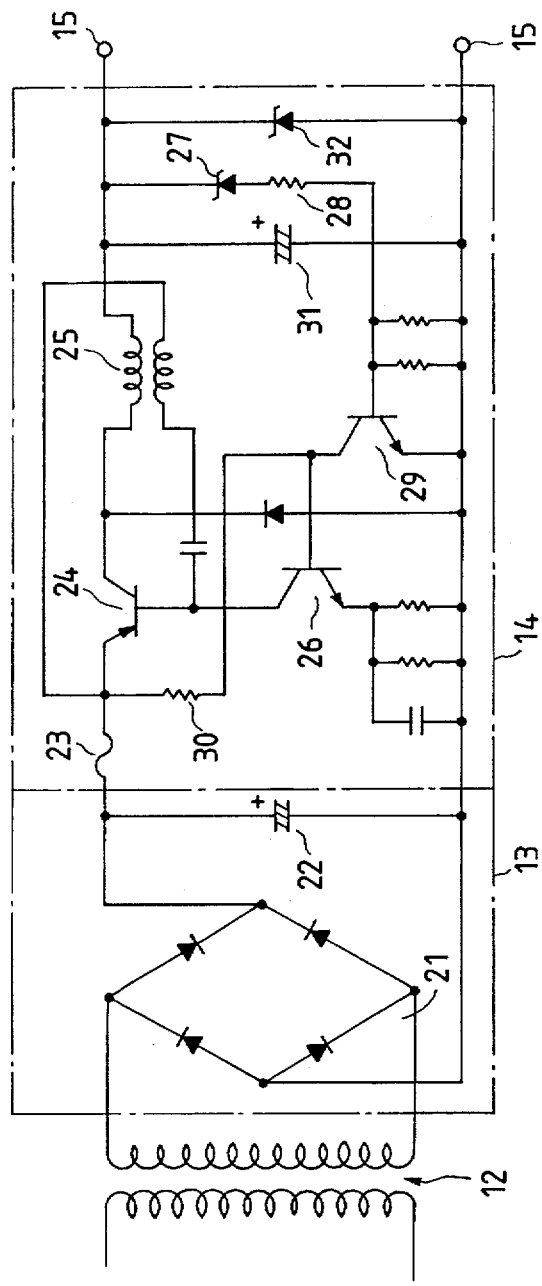

AC-DC ADAPTER

This is a Continuation of application Ser. No. 08/312,769 filed Sep. 27, 1994, now abandoned.

BACKGROUND OF THE INVENTION

1. Field of the Invention

This invention relates to an alternating current-direct current ("AC-DC") adapter which converts an alternating current into a direct current having a predetermined voltage value and further relates to an AC-DC adapter which converts an alternating current into a direct current having a predetermined voltage value and a predetermined current value.

2. Related art

A conventional AC-DC adapter of this type is designed so as to convert a predetermined AC voltage into a predetermined DC voltage. Hence, in order to use the AC-DC adapter in other countries which use different commercial power standards and in order to make the AC-DC adapter usable world-wide, the AC-DC adapter has a change-over switch. For instance, in the case where it is required to convert an AC voltage into DC 4.5V, the switch is operated so that a predetermined AC voltage is obtained from a variety of input AC voltages.

For the same purpose, some of the AC-DC adapters have a switching circuit.

When, for instance, electronic devices equipped with the above-described AC-DC adapters are shipped to foreign countries which have different commercial power standards, the AC-DC adapters must be adjusted so as to meet the commercial power standards in the countries, thus different AC-DC adapters must be provided for the different countries and a plurality of kinds of AC-DC adapters must be provided for one kind of electronic device. This means that a variety of AC-DC adapters are manufactured on a small scale, and that the AC-DC adapters manufactured have a high manufacturing cost.

In the case of the AC-DC adapter having a change-over switch, the following procedure must be taken. In the country where the AC-DC adapter is used, after confirmation of the voltage of the local commercial power source, the change-over switch is suitably operated to switch to the appropriate input voltage. However, the confirmation of the local power source voltage, and the operation of the switch are troublesome and, therefore, the AC-DC adapter is difficult to operate.

If the confirmation of the local power source voltage, or the operation of the switch is incorrect, then an AC voltage different from the rated value may be inputted. In this case, the transformer in the AC-DC adapter may be damaged, or the constant-voltage circuit for processing the secondary voltage of the transformer may be damaged.

Furthermore, the AC-DC adapter with the switching circuit is disadvantageous in that the switching circuit is intricate and has a large number of components, and accordingly has a high manufacturing cost.

SUMMARY OF THE INVENTION

In view of the foregoing, an object of this invention is to provide an AC-DC adapter for world-wide use which can be operated without having to know the input voltage.

The foregoing object of the invention has been achieved by the provision of an AC-DC adapter which, according to the invention, includes: a power transformer to which an AC voltage is applied; a rectifier circuit for rectifying and smoothing the AC voltage that is developed across the secondary side of the power transformer; and a self-excited constant-voltage constant-current circuit for stabilizing a DC voltage outputted by the rectifier circuit.

In the AC-DC adapter of the invention, the input AC voltage is converted into a predetermined AC voltage by the power transformer, the predetermined AC voltage is converted into a DC voltage by the rectifier circuit, and the DC voltage is then stabilized by the self-excited constant-voltage constant-current circuit. Hence, for instance, a stable DC voltage of 4.5V is obtained from an AC input voltage of 90V to 264V. Therefore, even in foreign countries, the AC-DC adapter can be used without knowing to the local power source voltage. In other words, the inventive AC-DC adapter can be used in foreign countries without modification.

Therefore, when electronic devices equipped with the inventive AC-DC adapters are to be shipped to foreign countries, it is unnecessary to manufacture different kinds of AC-DC adapters for the different countries. Thus, a single AC-DC adapter can be used in all countries. This means that the AC-DC adapters of the invention can be produced on a large scale, thereby being less expensive to manufacture.

Furthermore, with the inventive AC-DC adapter, the local voltage of the commercial power source need not be confirmed and the change-over switch or the like is unnecessary. That is, the inventive AC-DC adapter can be operated easily.

In addition, the inventive AC-DC adapter does not encounter the problems and potential damage that occurs when an AC voltage different from the rated value is erroneously inputted.

The AC-DC adapter of the present invention, unlike the conventional ones which use a switching circuit, employs the self-excited circuit. Hence, the inventive AC-DC adapter, has a simple arrangement, and has a reduced number of components, and accordingly a low manufacturing cost.

BRIEF DESCRIPTION OF THE DRAWINGS

FIG. 1 is a block diagram showing the fundamental arrangement of an AC-DC adapter according to the invention;

FIG. 2 is a circuit diagram showing a concrete example of an AC-DC adapter, which constitutes a first embodiment of the invention.

DETAILED DESCRIPTION OF THE PREFERRED EMBODIMENTS

Figure 3:
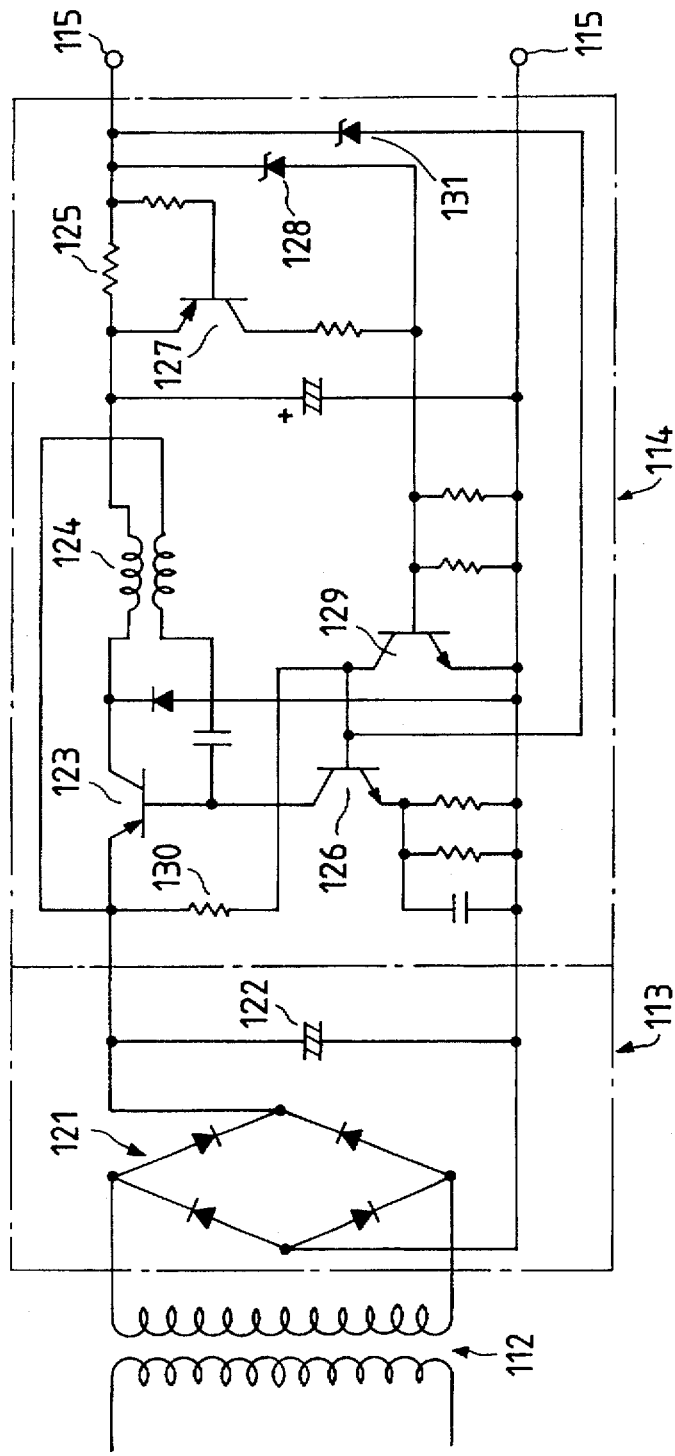
FIG. 3 is a circuit diagram showing a concrete example of an AC-DC adapter, which constitutes a second embodiment of the invention.

Preferred embodiments of this invention will be described with reference to the accompanying drawings.

First embodiment

FIG. 1 shows an AC-DC adapter, which constitutes a first embodiment of the invention. As shown in FIG. 1, the AC-DC adapter 10 comprises: a power transformer 12 whose primary side is connected to input terminals 11; a rectifier circuit 13 connected to the secondary side of the transformer 12; a "self-excited constant-voltage circuit" 14 connected to the output side of the rectifier circuit 13; and output terminals 15 connected to the output side of the constant voltage circuit 14.

The rectifier circuit 13 and the constant-voltage circuit 14 are shown more detail in FIG. 2. The rectifier circuit 13 is made up of a bridge rectifier 21 to which the secondary AC voltage of the power transformer 12 is applied, and a smoothing capacitor 22 connected to the bridge rectifier 21.

The constant-voltage circuit 14 comprises: a fuse 23 connected in series to the output line of the rectifier circuit 13; a control transistor 24; a choke coil 25; a comparison transistor 26 connected between the base of the control transistor 24 and ground; and an amplifier transistor 29. The base of the transistor 29 is connected through a resistor 28 and a constant-voltage diode 27 to the output terminal 15, the collector is connected to the base of the comparison transistor 26, and the emitter is connected to ground.

The secondary side of the choke coil 25 is connected to the input side of the control transistor 24 (i.e., the choke coil 25 is connected between the emitter and the base of the control transistor 24). The base of the comparison transistor 26 is connected through a resistor 30 to the emitter of the control transistor 24.

In the AC-DC adapter, an AC voltage applied across the input terminals 11 is converted into a predetermined AC voltage by the power transformer 12, which is converted into a DC voltage by the bridge rectifier 21 and the smoothing capacitor 22 in the rectifier circuit 13. The DC voltage is applied to the constant-voltage circuit 14, where it is controlled by the control transistor 24 (as described below), and then applied through the choke coil 25 to the output terminal 15.

According to this circuit, the current induced in the secondary side of the choke coil 25 is applied through the resistor 30 to the comparison transistor 26, where it flows between the collector and the base.

The voltage at the output terminal 15 is applied through the constant-voltage diode 27 and the resistor 28, as a predetermined voltage or lower, to the base of the amplifier transistor 29 and is amplified by the amplifier transistor 29, and applied to the base of the comparison transistor 26.

Thus, the comparison transistor 26 operates (based on the voltages from the choke coil 25 and the amplifier transistor 29) to switch the state of the control transistor 24, thereby to allow the control transistor 24 to control the direct current. The direct current is then smoothed by the capacitor 31, and converted by the constant-voltage diode 32 into a direct current having a predetermined voltage value, which is provided at the output terminal 15.

Second embodiment

A second embodiment of the invention will be described with reference to FIG. 3. The fundamental arrangement of the second embodiment is similar to that of the first embodiment.

In the second embodiment, a rectifier circuit 113 and a constant-voltage, constant-current circuit 114 are formed as shown in FIG. 3. The rectifier circuit 113 comprises: a bridge rectifier 121 to which the secondary AC voltage of the power transformer 112 is applied; and a smoothing capacitor 122 connected to the bridge rectifier 121.

The constant-voltage, constant-current circuit 114 includes: a control transistor 123 connected to the output line of the rectifier circuit 113; a choke coil 124; a current detecting resistor 125; a comparison transistor 126 connected between the base of the control transistor 123 and ground; and a current detecting transistor 127 for amplifying a voltage developed across the current detecting resistor 125; a constant-voltage diode 128 connected between the output side of the resistor 125 and the collector of the transistor 127; and an amplifier transistor 129. The base of the amplifier transistor 129 is connected to the collector of the current detecting transistor 127, and the collector of the amplifier transistor 129 is connected to the base of the comparison transistor 126.

The secondary side of the choke coil 124 is connected to the input side of the control transistor 123 (i.e., the choke coil 124 is connected between the base and emitter of the control transistor 123). The base of the comparison transistor 126 is connected through a resistor 130 to the emitter of the transistor 123.

In the AC-DC adapter 110, an AC voltage applied across the input terminals 111 is converted into a predetermined AC voltage by the power transformer 112, which is converted into a DC voltage by the bridge circuit 121 and the smoothing capacitor 122. The DC voltage is applied to the constant-voltage, constant-current circuit 114, where it is controlled by the control transistor 123 (as described below), and then is applied through the choke coil 124 and the resistor 125 to the output terminal 115.

In this operation, the current induced in the secondary side of the choke coil 124 is applied through the resistor 130 to the comparison transistor 126, where it flows between the collector and the base.

The current flowing in the resistor 125 develops a voltage across the resistor 125 and is amplified by the transistor 127. The voltage thus amplified, after being limited to a predetermined value or lower by the constant-voltage diode 128, is applied to the base of the amplifier transistor 129. The amplifier transistor 129 amplifies the voltage, which is then applied to the base of the comparison transistor 126.

Part of the current flowing to the output terminal 115 is applied through the diode 131 to the base of the comparison transistor 126.

Thus, the comparison transistor 126 switches the state of the control transistor 123 according to the voltage and current provided through the choke coil 124, the current detecting resistor 125 and the output terminal 115 so that the direct current at the output terminal 115 is constant both in voltage and in current.

With the AC-DC adapter 10, for instance, an input AC voltage of 90V to 264V is changed into an AC voltage of 5V to 30V by the power transformer 12, and a DC voltage of 4.5V is provided at the output terminal 15 with the aid of the rectifier circuit 13 and the constant-voltage circuit 14 (or the constant-voltage, constant-current circuit 114). Hence, the AC-DC adapter 10 can be applied to different commercial power sources in many countries without switching the input AC voltage. Since the input AC voltage is lowered by the power transformer 12, the rectifier circuit 13 and the constant-voltage circuit 14 (or the constant-voltage, constant-current circuit 114) the inventive circuit includes circuit elements which are small and have a low isolation voltage, and are readily available. This simplifies and miniaturizes the design of the AC-DC adapter. The above described AC-DC adapter may be utilized, for instance, for an electric charger.

As described above, the AC-DC adapter can be used without having to know to the input voltages and therefore, can be used all over the world. Thus, the inventive AC-DC adapter has many practical uses.

What is claimed is:

1. An AC-DC adapter comprising:
   a power transformer to which an input AC voltage in a predetermined range is applied, said power transformer transforming said input AC voltage to a secondary AC voltage having a predetermined voltage less than a voltage within said predetermined range;
   a rectifier circuit for rectifying and smoothing said secondary AC voltage developed across a secondary side of said power transformer; and DC voltage stabilizing means for stabilizing a DC voltage outputted by said rectifier circuit such that said AC-DC adapter is usable with a power source within said predetermined range without any adjustment necessary to said AC-DC adapter.

2. The AC-DC adapter as claimed in claim 1, wherein the DC voltage stabilizing means includes a self-excited constant-voltage circuit.

3. The AC-DC adapter as claimed in claim 1, wherein the DC voltage stabilizing means includes a self-excited constant-voltage constant-current circuit.

4. The AC-DC adapter as claimed in claim 1, wherein the rectifier circuit includes a bridge rectifier to which the AC voltage developed across the secondary side of said power transformer is applied, and a smoothing capacitor connected to the bridge rectifier.

5. The AC-DC adapter as claimed in claim 2, wherein the DC voltage stabilizing means includes:
   a fuse connected in series to the output line of the rectifier circuit;
   a control transistor having an input coupled to said fuse;
   a choke coil coupled to said control transistor;
   a comparison transistor connected between a base of the control transistor and ground; and
   an amplifier transistor having a base connected through a resistor and a constant-voltage diode to an output terminal, a collector connected to a base of the comparison transistor, and an emitter connected to ground,
   wherein a secondary side of the choke coil is connected between an emitter and the base of the control transistor, and the base of the comparison transistor is connected through a resistor to the emitter of the control transistor.

6. The AC-DC adapter as claimed in claim 3, wherein the DC voltage stabilizing means includes:
   a control transistor connected to an output of the rectifier circuit;
   a choke coil coupled to said control transistor;
   a current detecting resistor coupled to said choke coil;
   a comparison transistor connected between a base of the control transistor and ground;
   a current detecting transistor for amplifying a voltage developed across the current detecting resistor;
   a constant-voltage diode connected between an output side of the resistor and a collector of the current detecting transistor; and
   an amplifier transistor having a base connected to the collector of the current detecting transistor and a collector connected to a base of the comparison transistor,
   wherein a secondary side of the choke coil is connected between the base and an emitter of the control transistor, and the base of the comparison transistor is connected through a resistor to the emitter of the control transistor.

7. The AC-DC adapter as claimed in claim 1, wherein the DC voltage stabilizing means includes a self-excited circuit.

8. The AC-DC adapter as claimed in claim 4, wherein the DC voltage stabilizing means includes a self-excited circuit.

9. The AC-DC adapter as claimed in claim 2, wherein the rectifier circuit includes a bridge rectifier to which the AC voltage developed across the secondary side of said power transformer is applied, and a smoothing capacitor connected to the bridge rectifier.

10. The AC-DC adapter as claimed in claim 9, wherein the DC voltage stabilizing means includes:
    a fuse connected in series to the output line of the rectifier circuit;
    a control transistor having an input coupled to said fuse; and
    a choke coil coupled to said control transistor.

11. The AC-DC adapter as claimed in claim 10, wherein the DC voltage stabilizing means further includes:
    a comparison transistor connected between a base of the control transistor and ground; and
    an amplifier transistor having a base connected through a resistor and a constant-voltage diode to the output terminal, a collector connected to the base of the comparison transistor, and an emitter connected to ground.

12. The AC-DC adapter as claimed in claim 11, wherein a secondary side of the choke coil is connected between an emitter and the base of the control transistor, and a base of the comparison transistor is connected through a resistor to the emitter of the control transistor.

13. The AC-DC adapter as claimed in claim 9, wherein the DC voltage stabilizing means includes:
    a control transistor connected to an output of the rectifier circuit;
    a choke coil coupled to said control transistor; and
    a current detecting resistor coupled to said choke coil.

14. The AC-DC adapter as claimed in claim 13, wherein the DC voltage stabilizing means further includes:
    a comparison transistor connected between a base of the control transistor and ground;
    a current detecting transistor for amplifying a voltage developed across the current detecting resistor; and
    a constant-voltage diode connected between an output side of the resistor and a collector of the current detecting transistor.

15. The AC-DC adapter as claimed in claim 14, wherein the DC voltage stabilizing means further includes:
    an amplifier transistor having a base connected to the collector of the current detecting transistor and a collector connected to a base of the comparison transistor,
    wherein a secondary side of the choke coil is connected between the base and an emitter of the control transistor, and the base of the comparison transistor is connected through a resistor to the emitter of the control transistor.

16. The AC-DC adapter as claimed in claim 2, wherein the DC voltage stabilizing means further includes:
    a control transistor connected to an output of the rectifier circuit, for controlling said self-excited constant-voltage circuit.

17. The AC-DC adapter as claimed in claim 5, further comprising an output terminal coupled to said self-excited constant voltage circuit,
    wherein a current induced in a secondary side of said choke coil is applied through said resistor to said comparison transistor such that said current flows between said collector and said base of said comparison transistor, and
    wherein a voltage at said output terminal is applied to said constant-voltage diode and said resistor as no more than a predetermined voltage, to said base of the said amplifier circuit,
    said comparison transistor receiving output voltages from said choke coil and said amplifier transistor to switch a state of said control transistor to thereby control a direct current, said AC-DC adapter further comprising a second capacitor coupled to said output of said choke coil and for smoothing said direct current outputted by said choke coil and for outputting said direct current having been smoothed to said constant-voltage diode for conversion into a direct current having a predetermined voltage and for output to said output terminal.

18. The AC-DC adapter as claimed in claim 3, wherein the DC voltage stabilizing means further includes:

a control transistor connected to an output of the rectifier circuit, for controlling said self-excited constant-voltage constant-current circuit.

19. The AC-DC adapter as claimed in claim 6, further comprising an output terminal coupled to said self-excited, constant-voltage constant-current circuit, wherein a current induced in a secondary side of said choke coil is applied through said resistor to said comparison transistor such that said current flows between said collector and said base of said comparison transistor, and wherein a voltage across said resistor is provided to said output terminal and applied to said constant-voltage diode and said resistor as no more than a predetermined voltage, to said base of the said amplifier circuit, and wherein a portion of the current flowing to the output terminal is applied through said constant voltage diode to said base of said comparison transistor.

20. The AC-DC adapter as claimed in claim 19, wherein said comparison transistor receives output voltages from said choke coil, said amplifier transistor and said resistor, and to switch a state of said control transistor based on said voltages from said choke coil, said output terminal, and said resistor to thereby control a direct current at said output terminal to be constant in voltage and in current.

* * * * *